United States Patent [19]

Davis

[11] Patent Number: 5,788,836
[45] Date of Patent: Aug. 4, 1998

[54] SEWAGE TREATMENT SYSTEM

[76] Inventor: Harold E. Davis, 37 Champney St., Groton, Mass. 01450

[21] Appl. No.: 879,698

[22] Filed: Jun. 18, 1997

Related U.S. Application Data

[62] Division of Ser. No. 459,481, Jun. 5, 1995, Pat. No. 5,674,399.

[51] Int. Cl.⁶ ................................ C02F 3/06; C02F 3/30
[52] U.S. Cl. ................................... 210/139; 210/151
[58] Field of Search ........................ 210/605, 621, 210/622, 618, 617, 629, 903, 150, 151, 141, 142, 143, 138, 139

[56] References Cited

U.S. PATENT DOCUMENTS

| | | | |
|---|---|---|---|
| 4,036,754 | 7/1977 | Peasley | 210/139 |
| 4,818,404 | 4/1989 | McDowell | 210/629 |
| 5,096,588 | 3/1992 | Albertson | 210/150 |
| 5,102,548 | 4/1992 | Baxter | 210/621 |
| 5,126,050 | 6/1992 | Irvine et al. | 210/621 |
| 5,478,464 | 12/1995 | Cyr | 210/151 |
| 5,520,812 | 5/1996 | Ryhiner et al. | 210/621 |

*Primary Examiner*—Thomas G. Wyse

[57] ABSTRACT

The invention is directed to a sewage treatment system and method for treating sewage by microbes. The system includes and the method uses a settling tank with residual activated sludge and mixed liquor and an activated biofilm filter. Incoming sewage into the settling tank forms a settling tank liquor mixed liquor. Increments of the settling tank liquor mixed liquor are treated in the activated biofilm filter and returned to the settling tank where the treated mixed liquor improves the quality of the settling tank liquor mixed liquor in the settling tank. The process of treating and returning incremental quantities of the settling tank liquor mixed liquor continues over a Predetermined period of time after which the sewage is fully treated.

5 Claims, 2 Drawing Sheets

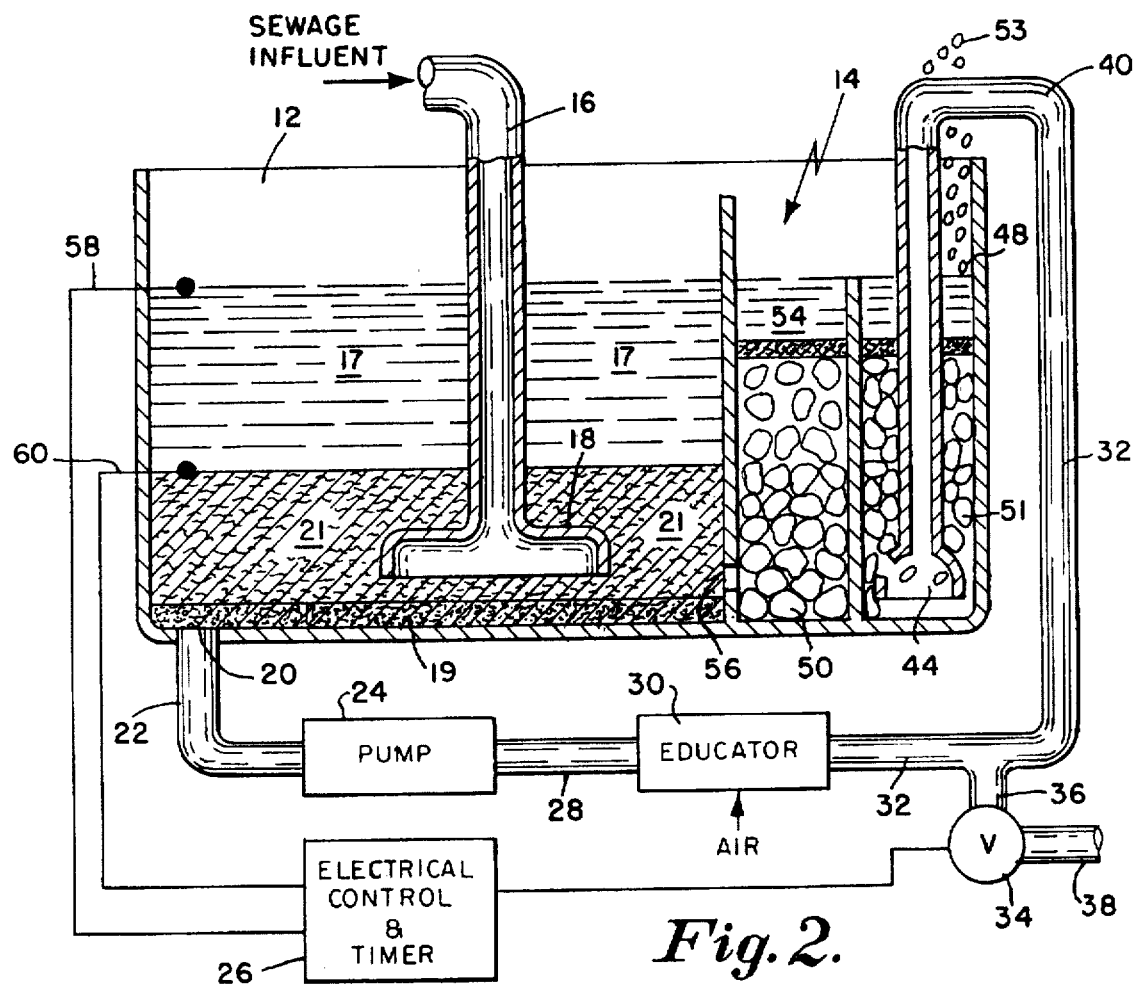
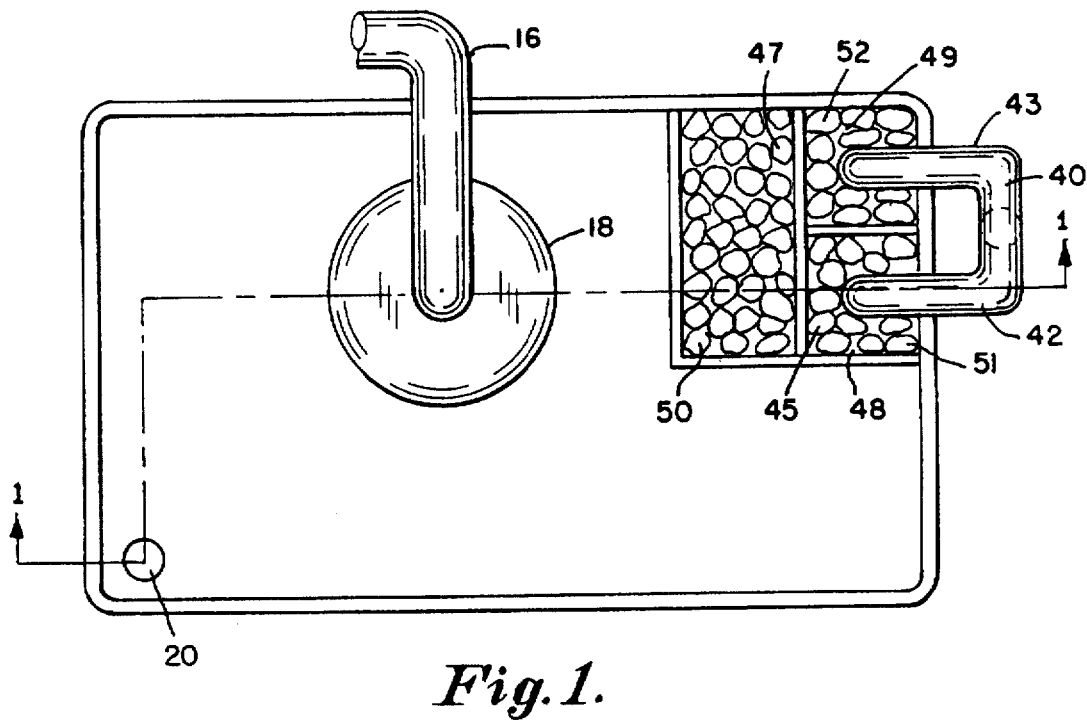

SEWAGE TREATMENT SYSTEM

This is a divisional of application Ser. No. 08/459,481 filed on Jun. 5, 1995, now U.S. Pat. No. 5,674,399.

INTRODUCTION

The invention is directed to a sequencing batch sewage treatment system and method for treating sewage by means of biological digestion by microbes. The system and method calls for mixing influent sewage with the residual liquor contained in a settling tank. A small fractional volume of the combined sewage and residual liquor in the settling tank is continuously removed. The volume removed is treated aerobically in an activated biofilm filter reactor and recirculated to the settling tank. The actions of removing the fractional volume of the settling tank liquor, aerating and treating the fractional volume of the mixed liquor, and returning it to the settling tank all take place simultaneously and continuously over a predetermined period of time. At the end of the predetermined period all of the settling tank liquor consists of treated liquor. A portion of the treated liquor equal in volume to the batch of sewage previously supplied is then removed from the settling tank and sent to an external dispersion field.

Process parameters may be adjusted to provide denitrification as well as some advanced treatment during which solids, phosphates, and nitrates are removed.

The sequencing batch system and method described and claimed is particularly suited to small capacity units for homes or a small community of homes. Also, under favorable conditions the concept may be adapted to continuous or semi-continuous operation, particularly when the volume of influent is very small relative to the size of the settling tank.

DEFINITIONS

Aerobic and anaerobic treatments are used in the conventional sense to mean biological treatment by microbes in oxygen rich and oxygen starved environments, respectively. Aerobic treatment is a process that reduces oxygen demand of carbon and nitrifies the nitrogen. Anaerobic processes can be used as a denitrification process when the nitrates are used as an oxygen source.

The terms biological treatment or biological digestion, or merely treatment and digestion may be used interchangeably. Mixed liquor is sewage containing volatile suspended solids.

Biofilm filter shall mean the series combination of a submerged attached growth filter and a suspended solids treatment region.

The term submerged activated biofilm filter reactor means a submerged reactor for treating liquor containing one or more biofilm filters. Biofilm filters may be connected in series or in parallel to increase treatment capacity.

The term activated is intended to identify the presence of aerobic microbes. Suspended solids and suspended sludge are also synonymous.

Incremental treatment refers to the treatment at any point in time of a small fraction, or fractional volume, of the volume of contents of the settling tank.

Settling tank liquor is defined as the mixture of sewage influent and the residual treated liquor remaining in the settling tank after a previously treated batch removed from the settling tank and sent to a dispersion field.

KNOWN PRIOR ART

Submerged attached growth filters using submerged fixed media have formed an integral part of sewage treatment plants in recent years. Submerged attached growth filters use submerged media as residence sites for microbes to form biofilms on the surface of media to enhance aerobic and anaerobic action as well as for performing classic mechanical filtering.

Activated biofilm filters have also been used in continuous systems heretofore, but not in combination with a settling tank and circulating fractional volumes.

Mixed liquor has been removed from a treatment tank and returned as motive liquor for an "aerator" in the Omniflo™ system reputedly covered by U.S. Pat. Nos. 4,648,967; 4,645,592; 4,711,716; 4,724,073; and 4,775,467. In the Omniflo system literature reviewed there is no mention of activated biofilters and the air supply is separate from the recirculation system during biological treatment. The functions of mixing, aerating and settling are performed in sequence and generally for different time intervals.

The Jeris U.S. Pat. No. 4,009,099 deals with a fluidized bed sewage treatment system that includes aerating means. Jeris points out many distinctions between a fluidized bed system and systems utilizing submerged attached growth filters.

The McDowell U.S. Pat. No. 4,818,404 features submerged attached growth filters with aerating means. Settling tanks or clarifiers are not used in conjunction with an individual filter.

A sequential batch sewage treatment system using submerged attached growth filters is described and claimed in U.S. patent application Ser. No. 08/176255 Filed Jan. 03, 1984.

OBJECTS OF THE INVENTION

It is an object of the invention to provide a sewage treatment system and method for single family residences or for small clusters of residences which avoids the limitations and disadvantages of prior systems.

It is another object of the invention to provide a sewage treatment system and method in which small fractional volumes of the contents of a settling tank are treated in a submerged activated biofilm filter reactor.

It is another object of the invention to utilize a method wherein both biofilm and suspended suspended solids treatment processes are combined in a process and apparatus where the functions of mixing, aerating, treating and settling are performed simultaneously.

It is another object of the invention to provide a method and apparatus where the amount of oxygen that is introduced into the system may be controlled for the purpose of performing anaerobic sewage treatment in an essentially aerobic system.

It is another object of the invention to provide a sewage treatment system for septic tank effluents which provides secondary and advanced treatment of the sewage which treatment includes the removal of suspended solids, nitrates.

It is still another object of the invention to treat the effluent from a septic tank aerobically and anaerobically in a simple and efficient manner.

BRIEF DESCRIPTION OF THE INVENTION

In accordance with the invention, the sewage treatment system and method and apparatus described and claimed herein utilizes an submerged activated biofilm filter reactor, and a settling tank which contains residual treated liquor.

A circulation subsystem is used in the apparatus and method to continuously remove a small fraction of the settling tank liquor contents of the settling tank. The removed fraction is coupled to an aerator where it is mixed with air or oxygen to form an aerated liquor. With the addition of air or oxygen to the food contained in the sewage the aerobic microbes reproduce and multiply rapidly.

The aerated fraction is pumped through a submerged activated biofilm filter reactor where the majority of the biological treatment takes place. The treated fraction is returned to the settling tank where it incrementally improves the quality of the settling tank liquor that remains in the settling tank. The sludge that escapes from submerged activated biofilm filter reactor eventually settles to the bottom of the settling tank.

As each fraction is returned the to the settling tank, the quality of contents is improved by a small increment. The fractional treatment is continuous over a predetermined period of time. At the end of the predetermined time the liquor in the settling tank is fully treated. The fully treated liquor, equal to the volume of sewage supplied to the apparatus is then removed from the system as a treated effluent and sent to a dispersion system.

The process of mixing, aerating, digesting and settling takes place simultaneously and continuously.

In the event denitrification is desired, the air or oxygen supply is terminated at the end of the aerobic cycle and circulation of fractions of the treated liquor continued for an additional predetermined period. Anaerobic conditions that exist within the system now predominate and denitrification increases.

The invention together with further objects and advantages will be best understood by reference to the following detailed description when taken in conjunction with the accompanying drawings.

DESCRIPTION OF THE FIGURES

FIG. 1 is a section of treatment tank taken along line 1—1 of FIG. 2 showing components embodied in the present invention;

FIG. 2 is a top view of a treatment tank embodying the principles of the present invention.

DETAILED DESCRIPTION OF THE INVENTION

Figure 3:
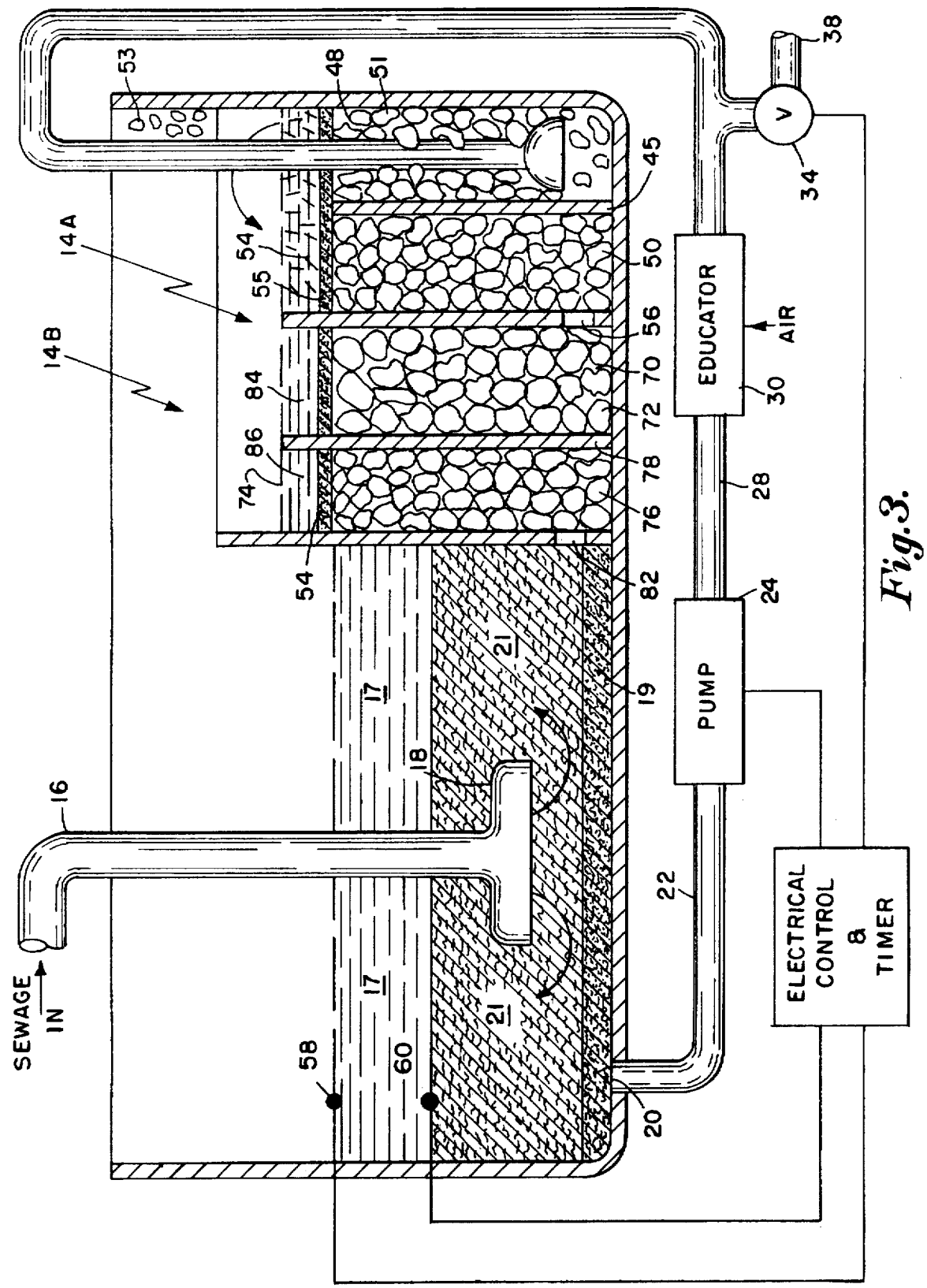
FIG. 3 shows an alternate configuration embodying two activated biofilm filters in series.

Referring to FIG. 1 there is shown a treatment tank 10 containing a settling tank 12 and a submerged activated biofilm filter reactor 14.

The settling tank 12 contains the submerged activated biofilm filter reactor 14 shown in FIG. 2 as situated in one corner. An outlet 20 is defined in the floor of the settling tank in an opposite corner.

Sewage is supplied to the settling tank 12 through a pipe 16 which is terminated in a distributor 18. The distributor 18 is purposely elevated above the floor of the settling tank 12 to mix the incoming sewage with the residual treated liquor 21 but to prevent incoming sewage from disturbing and mixing with the sludge 19 on the bottom of the settling tank 12.

The submerged activated biofilm filter reactor 14 comprises submerged attached growth filters 47, 48 and 49 and a suspended solids growth region 54. Each submerged attached growth filter contains a column of attached growth media 50, 51, and 52. The attached growth media is preferably irregularly shaped and coarse to maximize surface area for attached growth and biofilm formation to take place. The media may be made of stone, plastic, coal and like configured and rather dense material. For reasons to be explained later the size of the growth media is in the vicinity of 0.75 inches to 4 inches in diameter.

The suspended solids growth region 54 is the flooded volume on top of the submerged attached growth filters 47.

Filters 48 and 49 are essentially identical in size and makeup. Each contains a pipe e.g. pipes 42 and 43 which extends though the column of media. The pipes 42 and 43 terminate at the bottom in distributors such as distributor 44. The distributors occupy much of the cross sectional area of the filters 48 and 49 and they are so designed to distribute aerated liquor and air flowing through the pipes 42 and 43 throughout as much of the cross section of the column of media as possible.

In this case the submerged attached growth filter 47 is twice as large in section as the others as there is no need for additional dispersion means. An outlet 56 is provided to permit mixed liquor from the submerged attached growth filter 47 to enter the settling tank 12.

The sewage treatment apparatus 10 also includes a pump means 24 which is coupled to the outlet 20 in the settling tank 12 by pipe 22. The pump 24 in turn is coupled to an eductor 30 which aerates the mixed liquor passing through the eductor 30. A compressor or other device for inserting air or oxygen into liquid may be used in place of the eductor 30.

The eductor 30 is coupled by pipe 32 to a manifold 40 which feeds pipes 42 and 43. A valve 34 is coupled to pipe 32 and the outlet of the eductor 30 though pipe 36.

The sewage treatment apparatus 10 also includes an electrical control and timer 26 which contains a timer, not shown. The electrical control and timer 26 is connected to a start switch 58, a stop switch 60 and the valve 34.

OPERATION OF THE SEWAGE TREATMENT APPARATUS

At the conclusion of a treatment cycle the electrical control and timer opens the valve 34 and treated liquor passes out of the system to a dispersion system, not shown, through pipe 36, valve 34 and pipe 38, as a fully treated effluent. When the level of the mixed liquor in the settling tank reaches the level of the stop switch 60, the switch 60 signals the electrical control 26 which turns off the pump 24 and closes valve 34.

The residual treated liquor, including the activated sludge 19 residing at the bottom of the settling tank 12 that remain in the settling tank 12 along with the biofilm remaining on the attached growth media become the source of microbes for digesting the next batch of sewage to be treated.

In a properly sized and designed system where the rate at which sewage is treated greatly exceeds the rate at which sewage is added to the settling tank, it is feasible to eliminate valving for incoming sewage and permit incoming sewage to continuously enter through pipe 16 where it is mixed with the treated mixed liquor to form the settling tank liquor 17.

When the level of settling tank liquor reaches the level of the start switch 58, the pump 24 is activated. A fraction of the settling tank liquor in the settling tank 12 is removed from the settling tank 12 through opening 20 and coupled to the eductor 30 where it is aerated by the air entering the eductor 30. The aerated liquor is then coupled to filter 48 and 49. Excess air 53 escapes from the top of filters 48 and 49.

The aerobic microbe population within the aerated mixed liquor increases rapidly in the presence of the dissolved oxygen in the air and food provided by the sewage. As the aerated liquor moves through the submerged attached growth filters 47, 48, in the submerged activated biofilm filter reactor 14, the aerobic microbes digest the sewage and deposit a biofilm on the surfaces the growth media contained in these growth filters.

In passing from filters 48 and 49 to filter 47 the settling tank liquor passes through the suspended solids treatment region 54 where additional biological treatment takes place.

The treated liquor leaves submerged attached growth filter 47 and enters the settling tank 12. As the treated liquor leaving the submerged activated biofilm filter reactor 14 is purer than the mixed liquor entering the submerged activated biofilm filter reactor 14 the quality of the contents of the settling tank is improved incrementally. Whatever sludge arrives in the settling tank with the treated liquor settles to the bottom of the settling tank.

The continuous process of removing a fraction of settling tank liquor from the settling tank and a returning the faction as treated liquor continuously improves the purity of the liquor within the settling tank until the contents is fully treated.

As the treatment proceeds there develops on the surface of the media in the submerged attached growth filters a biofilm layer. As the treatment proceeds the thickness of the biofilm layer which is essentially sludge, increases to the point where an excess of biofilm on the growth media constricts the flow of mixed liquor through the submerged activated biofilm filter reactor 14.

In the case of growth filters 48 and 49, the flow of aerated liquor within these filters strips the excess biofilm from the growth media 51 and 52 and impedes these filters from clogging. The stripped biofilm from filters 48 and 49 is carried over to the growth filter 47 by the aerated liquor. Some sludge remains in the submerged activated biofilm filter and after a period of years may need to be blown out with air.

A layer 55 of sludge builds up on top of the filter 47. This layer 55 and the buildup of biofilm on the surfaces of the attached media 50 in filter 47 constricts the flow of mixed liquor through filter 47. The level of the mixed liquor within the filter 47 is set so that a depth of liquor exists above the layer 55, and forms the suspended solids treatment region 54. The mixed liquor passing through the suspended solids treatment region 54 is also aerobically treated.

Additional treatment takes place on the submerged attached growth media 50 as the mixed liquor passes from the suspended solids treatment region 54 through the submerged attached growth filter 47. The excess sludge built up and stripped from media 50 as well as sludge from suspended solids region 54 is carried through the filter 47 to the settling tank 12 where it settles to the bottom of the settling tank as residual sludge 19 or is mixed with incoming sewage.

Virtually all of the treatment takes place in the submerged activated biofilm filter reactor 14.

The treatment processes continue uninterrupted for a predetermined period of time after which the valve 34 is opened by the electrical control and timer 26 allowing the treated mixed liquor to leave the reaction tank 10 through valve 34 as a treated effluent and enter a dispersion means, not shown.

The combined effects of biofilm treatment and suspended solids is believed to reduce excess sludge production. Further, it is theorized that biofilms abounds in higher ranks of predators, such as protozoa which coexist with aerobic and anaerobic microorganisms. These predators are particularly active in the layer of sludge 55 and reduces excess sludge production and contributes to the clarity in the fully treated mixed liquor.

In an example of a typical two household sewage treatment system, the system would be required to treat about 400 gallons of sewage per day. The settling tank would have a capacity of about 1100 gallons a day to take care unusual and unexpected overloads. The submerged growth filters 48 and 49 would be ½ square foot in cross section and 3 feet high. Each filter would contain growth media of from ¾" to 4 inches in diameter. The height of the media is typically about 3 feet.

The submerged attached growth filter 47 would be typical 1 foot deep and 2 feet wide or about 2 square feet in cross section. The height of the growth media in filter 47 is also about 3 feet. The height of the suspended solids region 54 under the foregoing conditions would be roughly ½ foot.

The velocity of the mixed liquor through each of filters 48 and 49 is regulated to 5 to 10 gallons per minute for the foregoing parameters. This velocity is sufficient to prevent the activated biofilm filter from clogging while permitting activated sludge to pass through for a long period of time. Eventually, cleaning of the submerged activated biofilm filter reactor will be required.

DENITRIFICATION

Denitrification may be performed by the simple act of not injecting air or oxygen in the liquor pumped from the settling tank. Tests taken of the effluent several hours after the air or oxygen has been shut off, while the flow of liquor continues through the system demonstrates that significant denitrification has taken place during the period in which the air or oxygen has been turned off. Effective denitrification can be accomplished in 2-3 hours in the system described above.

It is not known why or how denitrification takes place as the concentration of dissolved oxygen in the mixed liquor is unexpectedly high. One theory is centered about the composition of the biofilm layer formed on the growth media.

It is known that the biofilm comprises a inner anaerobic layer attached to the growth media over which resides an aerobic layer. It is also known that the sludge residing on the bottom of the settling tank contains an anaerobic volume adjacent to the bottom of the settling tank and on top of which is an aerobic layer.

It is theorized that the relative thickness of the anaerobic biofilm layer and the relative thickness of the anaerobic layer adjacent to bottom of the settling tank increases during the time when the air and oxygen are cut off. It is theorized that the changes in thickness results from the diffusion from the anaerobic layer to the aerobic layer of microorganisms that have the ability of taking oxygen from nitrates.

FIG. 3 EMBODIMENT

Under certain circumstance where the aerated mixed liquor contains a large surplus of air, the air rushing through the coarse media 51 and 52 will strip the biofilm growth from the surface of the media 51 before the biofilm develops sufficiently for efficient treatment. The system shown in FIG. 3 is designed to overcome the limitation described above.

The simplest solution is to add an additional submerged attached growth filters and an additional suspended solids treatment regions in submerged activated biofilm filter reactor. In FIG. 3 the treatment tank 12 contains a first submerged activated biofilm filter reactor 14A. A second submerged activated biofilm filter reactor 14B comprises a submerged attached growth filter 70 containing media 72. Filter 70 is separated from a second submerged attached growth filter 74 containing media 76 by a wall 78. Filter 74 is separated from the settling tank 12 by a wall 80.

An opening 56 joins the first submerged activated biofilm filter reactor 14A to the second 14B. The second submerged activated biofilm filter reactor 14B is connected to the settling tank 12 through and opening 82.

OPERATION OF THE FIG. 3 CONFIGURATION

Sewage influent is supplied through pipe 16 as previously described and is processed in the settling tank 12. The pump 24 removes a fraction of the settling tank liquor and it is aerated in the eductor 30 in the manner previously described. Aerated liquor enters the submerged activated biofilm filter reactor 14A through pipe 42 and into submerged activated biofilm filter reactor 49 through pipe 43. See FIGS. 1 and 2.

The aerated mixed liquor is released into compartment 72 and permitted to percolate through submerged attached growth media 51. It is presumed, in this instance, that there is a large excess of undisolved air bubbles 53 in the mixed liquor. As biofilm begins to build on the surface of the media 51 the undisolved air 53 strips the biofilm from the surface of the media 51 before it can achieve a high degree of activity.

The stripped biofilm is carried over and deposited on the media 50. Some of the stripped growth remains in suspension forming a first suspended solids treatment region 55.

The liquor flowing through the media 50 enters filter 70 through the opening 56. It proceeds upward through the submerged attached growth filter 70 to a suspended solids treatment region 84. It then proceeds through a suspended solids treatment region 86 above the submerged attached growth filter 74.

Further treatment occurs in the attached growth filters 70 and 74 and the suspended solids treatment regions 84 and 86.

The submerged media 76 in filter 74 is fully capable of treating the mixed liquor flowing through the filter 74, so that, the liquor entering the filter 74 is virtually fully treated. Under these conditions the filter 74 acts as a convenient means of egress for the mixed liquor through the opening 82 into the settling tank 12. It is preferable to insert the treated liquor above the residual sludge 17 in the settling tank 12 to prevent mixing the treated liquor with the sludge in the settling tank 12.

The height of the mixed liquor in the submerged activated biofilm filter reactor is controlled by the height of the wall 78. Wall 78 is higher than wall 45 thus assuring a generous suspended solid treatment region. If wall 86 was the same height as wall 82 there would be no suspended solid treatment regions as the mixed liquor may flow directly from filters 48 and 49 to filter 47 without creating a depth of suspended solids above the submerged media in the filters.

With the 1100 gallon tank and the FIG. 3 embodiment filters 48 and 49 measure 6 inches wide by 1 ft deep. Filter 47 measures 15 inches wide by 2 feet deep. Filter 70 measures 9 inches wide by 2 feet deep and the final filter 74 is 6 inches wide by 2 feet deep. Combinations of submerged attached growth filters and suspended solids treatment regions, i.e. biofilm filters, may be added in series, e.g filters 47 and 48, or in parallel, e.g. filters 48 and 49, to increase the treatment capacity of a system. Further the preferred ratio of the volume of aerated liquor in the submerged activated biofilm filter reactor to volume of the settling tank liquor is in the range of 25% to 50%.

The treatment as described above in connection with FIGS. 1, 2 and 3 involves the removal of a relatively small fraction of settling tank liquor from the settling tank and treating it in a submerged activated biofilm filter reactor and returning the treated fraction to the settling tank 12. The quality of the liquor contained in the settling tank is improved with each added fraction of treated mixed liquor received from the submerged activated biofilm filter reactor. At the end of the treatment cycle a portion of the treated liquor, generally equal to the volume of the batch of influent sewage, contained in the tank may be removed from the settling tank and dispersed as a treated effluent.

In most prior art treatment process, treatment takes place by means of single pass through single large system or through a series of staged smaller systems. Either of the these arrangements are unsuitable for residences because of size alone. The system described and claimed herein uniquely treats only a fraction of the batch of sewage supplied to the system during any instant of time. The system relies on continuously circulating small fractions over a period of time to duplicate the treatment time provided in much larger systems.

While the invention has been particularly shown and described with reference to preferred embodiments thereof, it will be understood by those skilled in the art that various changes in form and details may be made therein without departing from the spirit and scope of the invention as defined by the appended claims.

The following is claimed:

1. A biological sewage treatment system comprising:

a settling tank containing a quantity of residual treated liquor, means for mixing influent sewage and said residual liquor for producing settling tank liquor;

a submerged activated biofilm reactor for treating aerated settling tank liquor and for supplying the treated liquor to the settling tank;

pump means in fluid communication with the settling tank for removing a fractional volume of settling tank liquid;

an aerator coupled to the pump means and the submerged activated biofilm filter reactor for aerating settling tank liquor and supplying the aerated liquor to the submerged activated biofilm filter; and control means for continuously operating said pump means over a predetermined period of time for simultaneously performing the functions of removing a fractional volume of the settling tank liquor, aerating the settling tank liquor, treating the aerated liquor and returning the treated liquor to said settling tank.

2. A biological sewage treatment system as defined in claim 1 where the aerator is an inductor.

3. A biological sewage treatment system as defined in claim 1 where said submerged activated biofilm filter reactor includes suspended solids treatment regions coupled in series with a submerged attached growth filter.

4. A biological sewage treatment system as defined in claim 3 where each submerged activated biofilm filter reactor includes multiple submerged attached growth filters each of which is coupled in series to a suspended solid treatment region.

5. A sewage treatment system comprising, a source of a mixture of influent sewage and treated liquor;

treatment means comprising a biofilm filter reactor having in series connection a submerged growth filter and a suspended solids region;

aerating means for aerating said mixture;

means for moving incremental volumes of said mixture through the aerating means and the biofilm filter reactor for treating said incremental volumes of said mixture and returning incremental volumes of treated liquor to said source; and means for removing treated liquor from the system.

* * * * *